United States Patent [19]
Shoch et al.

[11] 3,837,733
[45] Sept. 24, 1974

[54] SHIFTABLE SCANNER APERTURE

[75] Inventors: Clinton W. Shoch, Orlando; George Lamar Harmon, Winter Park, both of Fla.

[73] Assignee: Martin Marietta Corporation, New York, N.Y.

[22] Filed: Nov. 27, 1970

[21] Appl. No.: 90,781

Related U.S. Application Data

[63] Continuation of Ser. No. 783,058, Dec. 11, 1968, abandoned.

[52] U.S. Cl. ............... 350/272, 244/3.17, 350/273
[51] Int. Cl. ........................... F41g 7/00, G02f 1/30
[58] Field of Search ................... 350/271, 272, 273; 244/3.17

[56] References Cited
UNITED STATES PATENTS

| | | | |
|---|---|---|---|
| 2,972,930 | 2/1961 | Norwood | 350/272 |
| 2,989,891 | 6/1961 | Rockafellow | 350/272 |
| 3,085,158 | 4/1963 | Miller | 350/272 |
| 3,167,605 | 1/1965 | Heidenhain | 350/272 |
| 3,176,312 | 3/1965 | Reinsch | 350/272 |
| 3,671,754 | 6/1972 | Mundkur | 350/272 X |

*Primary Examiner*—Malcolm F. Hubler
*Attorney, Agent, or Firm*—Julian C. Renfro; Gay Chin; Edwin E. Greigg

[57] ABSTRACT

This invention relates to a shiftable aperture arrangement for an optical area correlator, which device functions effectively to accomplish a switching between fields of view during range closure of a missile with respect to its target. It is desirable to launch a missile while viewing with small field of view optics, a comparatively small target area on the ground, and then at about 15 percent range closure, to switch so as to view with large field of view optics the same area. Rather than accomplishing field of view switching by using separate optical elements and a combining glass and shutter arrangement, this invention provides the equivalent field of view switching by a simple mechanical repositioning of the area correlator scanning slit at the image plane so as on occasion to scan a larger area. The repositioning of the slit is accomplished in a very precise manner even though the speed of slit rotation may be high.

12 Claims, 12 Drawing Figures

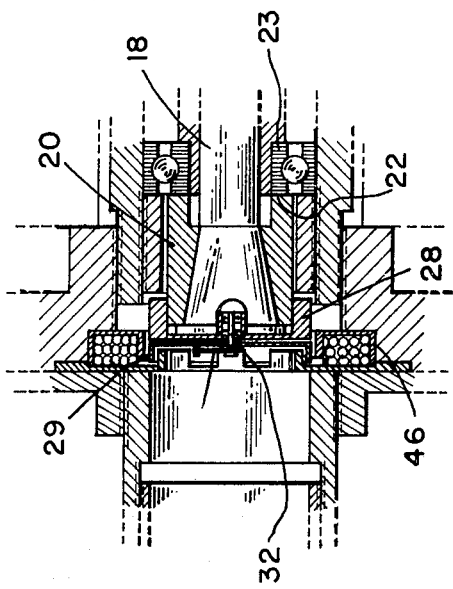
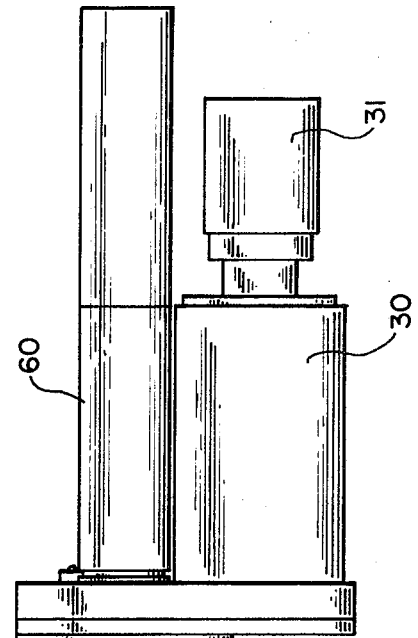
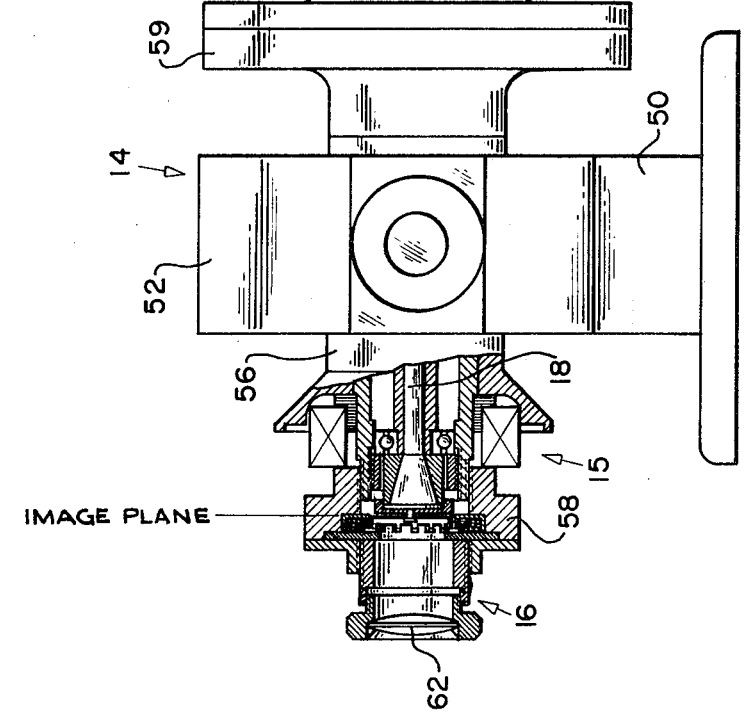
FIG. 2
FIG. 1
IMAGE PLANE
INVENTORS
CLINTON W. SHOCH
GEORGE LAMAR HARMON
BY *Julian C. Renfro*
ATTORNEY

INVENTORS
CLINTON W. SHOCH
GEORGE LAMAR HARMON

BY *Julian C. Renfro*

ATTORNEY

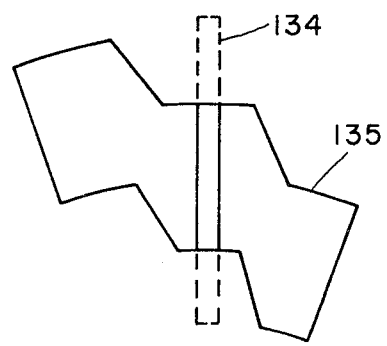
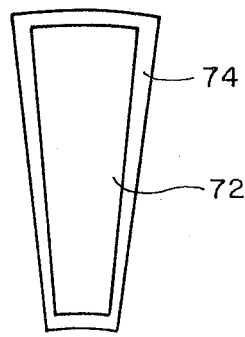
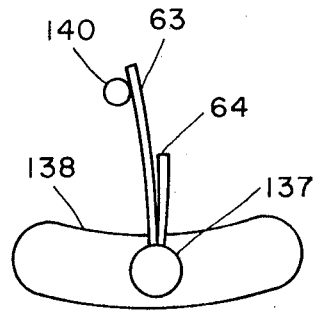
FIG. 11
FIG. 12
INVENTORS
CLINTON W. SHOCH
GEORGE LAMAR HARMON
BY *Julian C. Renfro*
ATTORNEY

SHIFTABLE SCANNER APERTURE

This is a continuation of application Ser. No. 783,058, filed Dec. 11, 1968, now abandoned.

The present invention relates to an improved component for a missile tracking system or the like, and more particularly to a shiftable scanner aperture concept effectively functioning to accomplish a switching between fields of view during range closure of a missile with respect to its target.

In the general type of tracking system with which the present invention is used, there is provided means to scan the target area to develop a contrast pattern uniquely characterizing the target. The system includes use with a memory to store a reference contrast pattern, and means to periodically update the stored pattern as closure is effected between the tracking system and the target.

An initial contrast pattern is stored at some predetermined point in the flight, by operation of the scanner included in the tracking system (or by pre-storing data produced by another scanner). At a succession of times during range closure, the memorized contrast pattern is updated by operation of the scanner. Between updating of the memory, the scanner operates to provide a live contrast pattern of the area within the field of view of the tracker at that time. The memorized and live patterns are compared, and correlation signals produced from which are derived control signals for use by the tracker.

As the result of the circular scanning arrangement, the contrast pattern generated thereby comprises a continuous (or appropriately digitized) signal representative of the target contrast as a function of the angle of rotation of the scanning element. The memory system is preferably a rotating disc operating synchronously with the scanning means, or any other suitable arrangement whereby the information stored therein is representative of the contrast pattern as a function of the scanner angle. The live and memorized patterns are correlated to provide information representative of the amount of angular misalignment between the two patterns. This information is further processed and roll, pitch, and yaw control signals are generated for modifying the orientation of the optical axis of the tracker to minimize the angular misalignment between the current and memorized contrast patterns.

The tracking system may be rigidly attached to the missile, in which case variations in tracker orientation are achieved by actually changing the angular attitude of the missile or by translation of the missile due to maneuvering commands. Preferably, however, the tracker is electronically or mechanically gimballed within the missile to decouple the tracker from missile attitude motion. This permits three angular degrees of freedom for the optical axis thereof. Under such circumstances, the roll, pitch and yaw signals referred to above serve only to re-orient the tracker axis. Suitable sensors associated with the tracker serve to detect changes in tracker orientation, and to initiate changes in the missile's course to realign it with the tracker. A system such as described above is shown in assignee's U.S. patent to Bogard et al., entitled "Data Processor for Circular Scanning Tracking System," U.S. Pat. No. 3,372,890, and assignee's U.S. Pat. application Ser. No. 536,834, filed Mar. 23, 1966, by Clyde R. Hembree entitled "Correlation Guidance System Having Multiple Switchable Field of View." The Hembree application issued on Dec. 17, 1968 as U.S. Pat. No. 3,416,752.

The Bogard et al. application is primarily concerned with a novel closed loop data processor for a circular scanning tracking system by which the correlation information may be converted into roll, pitch, and yaw control signals. The present invention is directed to an independent, though complementary sub-system by which there is provided information in the system memory at the appropriate times in order to prevent the build-up of errors which result due to the range closure between the target and the missile. This invention may also be regarded as an improved implementation of certain components and concepts taught in the Hembree patent.

As described in detail below, the correlation of the reference contrast pattern and the currently acquired pattern is directly affected by the fact that the distance between the missile and the target is constantly decreasing until missile impact. A first effect on such range closure is that of "object blow-up." As the missile approaches the target, all of the objects within the field of view of the scanner appear to be increasing in size. Thus, the target scene changes because portions of the originally memorized pattern disappear radially from the field of view and other portions enter the field of view or otherwise become re-oriented as the target approaches the missile. Because the live and stored scenes actually are different, the aiming point will shift as the tracker correlation system compares the two scenes.

The second range closure phenomenon might be termed "horizon effect." For purposes of description, the area observed by the scanner field of view could be composed of both sky and ground surfaces, two highly contrastive regions separated by the horizon. As the missile approaches the target, the intersections of the scanner field of view and the horizon do not appear at the constant angular position in the scan. Thus, the correlation between the stored and the current data will be such that the system will attempt to reorient the tracker to maintain the original angular relationship with the horizon. This causes the original aim point to shift due to the interaction between live and stored horizons during range closure. Thus, this represents an additional error caused by range closure. In an attempt to correct such apparent though false errors, the orientation of the tracker axis is directed further and further away from the actually desired orientation. Eventually, the target (original aim point) completely disappears from the optical field of view if means are not provided to counter the effects of range closure. Roads, land to water boundaries and, in fact, all major contrasting regions also yield the "horizon effect" to a greater or lesser extent affecting accuracy.

Prior to this invention, several techniques have been proposed to compensate the errors accruing from range closure effects. One such technique is to include means within the system to periodically rememorize the target scene. This approach is often used; however, it alone cannot correct the tracking error due to the horizon effect, and as to blow-up effects, can only limit the extent and/or the rate at which such error is permitted to grow. As may be understood, each rememorization of the target scene results in the insertion into the memory of the target scene actually viewed by the tracker at the time of rememorization. Thus, any errors present in the orientation at such time, e.g., due to angular misalignment, servo noise, etc., are included in each new reference target pattern. The accumulation of such errors through successive rememorizations, may under certain circumstances lower the system's over-all tracking accuracy to the extent that its effectiveness is decreased, for example, in an attack on a "hard" target where a direct hit is essential.

Alternatively, because an optical system having a given field of view will scan continuously decreasing areas as the distance between the missile and the target is decreased, and, in effect magnify the image more and more, causing the accrual of drift errors due to the horizon effect, it has been proposed that the range closure effects described above could be compensated for by increasing the field of view of the optical system during range closure. One approach of this type would involve the use of a mechanical zoom lens in the optical portion of the tracker. While such an obvious arrangement has been used, it has proven to be undesirable because of the complexity of the required mechanical systems, because of the low speeds of response thereof, and because of the tendency for the optical boresight of zoom lens of this type to "helix" and to exhibit other mechanical tolerance limitations as the missile approaches the target. A further disadvantage is that the optical "gain" of the system is steadily decreased, thereby lowering accuracy.

In contrast to the above, the system of the present invention substantially overcomes the difficulties of previously used variable field of view optical systems, and provides a means whereby the effects of range closure on the accuracy of the correlations guidance system may be substantially eliminated. The present invention is adapted for use in an optical correlation guidance system such as shown in the above-mentioned Bogard et al. patent, and comprises a single lens, a suitable photodetector, a circular scanning disc arrangment having means for shifting the effective slit area radially, an analog to digital converter, memory means, and means to correlate current target data with information stored in the memory, such as in the Bogard et al. invention.

A preferred embodiment of our shiftable aperture arrangement for an optical area correlator may involve a plurality of adjacent members rotatable about a common axis, and disposed in the image plane of the optical area correlator. A first of these members contains a scanning slit, and a second member, selectively rotatable with respect to the first member for a few degrees, contains an aperture essentially aligned with the slit, such aperture having an irregular yet pre-established configuration such that relative rotative movement of said members accomplishes a radial repositioning of the effective area of the scanning slit.

The effective area of the slit may be movable between pre-established radially inner and radially outer positions, or may be movable between more than two different radial positions. Also, the effective area of the slit may remain essentially constant as it moves radially, or it may be arranged to get progressively larger as it moves radially outwardly.

The present invention comprehends use with suitable logic circuitry adapted to operate in accordance with the principles disclosed herein to select the appropriate position of the shiftable aperture at a given time. In a preferred embodiment, there is provided a low inertia arrangement to alternate the position of the aperture as may be required.

The provision of multiple switchable fields of view greatly improves the accuracy of correlation, and provides means to prevent the accumulation of drift errors causec by "horizon effect" shift during range closure. The present invention is superior to systems incorporating mechanical zoom lenses, both as a result of decreased complexity, increased speed of response, and also due to improved accuracy associated with the ease of boresight alignment.

Accordingly, it is an object of this invention to provide an improvement in optical correlation guidance systems.

It is a further object of this invention to provide a correlation guidance system employing an optical sub-system having an improved multiple switchable field of view.

It is an additional object of this invention to provide a multiple switchable field of view with only a single objective lesn being utilized.

It is another object of our invention to provide a field of view switching arrangement having low inertia, and hence able to be switched very rapidly.

It is yet another object of this invention to provide an optical correlation guidance system wherein the effects on the accuracy thereof of range closure are substantially eliminated.

It is still another object of this invention to provide in a correlation guidance system an optical sub-system employing multiple switchable fields of view, which prevents the accumulation of errors due to successive rememorizations of a target pattern during range closure.

It is a still further object of this invention to provide in a correlation guidance system, a single lens optical arrangement selectively employed to produce images both for storage and current correlation, and having provision for selectively choosing the appropriate aperture position in accordance with the degree of correlation between the current and stored target contrast patterns.

It is a yet further object of this invention to provide in a correlation guidance system having a variable field of view, an optical sub-system characterized by heretofore unavailable simplicity, accuracy and reliability.

The exact nature of this invention, as well as other objects, features and advantages thereof will be clear from consideration of the following detailed description, and the accompanying drawings in which:

FIG. 1 is a side-elevational view of a tracker in accordance with our invention, and designed for use in a missile, with portions cut away to reveal certain details of internal construction;

FIG. 2 is a fragmentary view of a portion of the tracker of FIG. 1, utilizing a larger scale to reveal facets of the internal construction employed in connection with the rotative aperture shifting mechanism;

FIG. 11 depicts a shiftable aperture construction of the type that may be used when a three field of view arrangement is to be utilized, involving a non-linear spring arrangement so that the effective area of the slit can be selectively altered in discrete steps; and FIG. 12 is a shiftable aperture arrangement of the type utilized at such time as extreme ratios between fields of view are desired.

DETAILED DESCRIPTION

Figure 3:
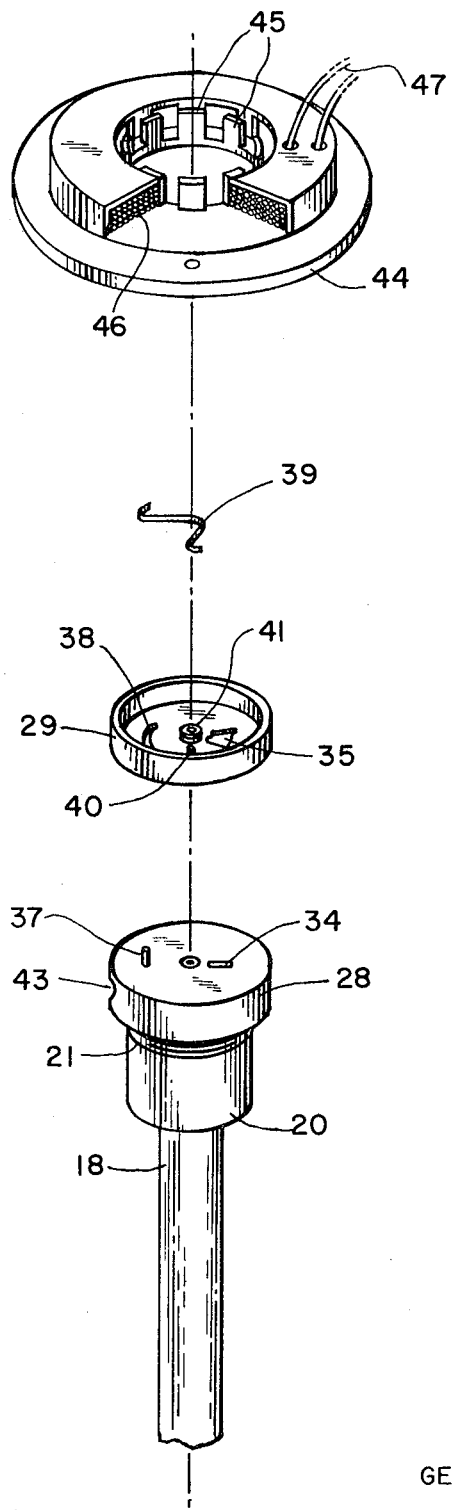
FIG. 3 is an exploded view of a shiftable aperture arrangement in accordance with our invention, with the uppermost component shown, for reasons of clarity, in the inverted position.

Referring now to FIG. 1, a correlation tracker 14 of an optical area correlation system is there shown, which device is designed to be mounted in a missile and utilized in a manner like that described in connection with the Bogard et al., U.S. Pat. No. 3,372,890, and the Hembree U.S. Pat. No. 3,416,752, which teachings may be considered to be incorporated by reference herein. The term tracker is used to describe the complete correlation tracker portion of a correlation system, which tracker is typically used in a missile. The tracker includes the platform, memory, scanner assembly and correlator.

The present invention principally involves the scanner portion of the tracker, the scanner 15 being understood to comprise the optical assembly 16, the light pipe 18, the rotating slit arrangement hereinafter described in detail, and a photomultiplier tube (not shown). The optical assembly 16 is supported in a housing 58, and its optical axis is effectively aligned with the boresight of the tracker. The assembly 16 includes an objective lens 62 aw well as a number of components described in connection with the enlarged showing represented by FIG. 2. The housing 58 is in turn supported by a tubular member 56 that is movably mounted in outer ring 52 by means of a two axis gimbal arrangement enabling pitch and yaw corrections to the tracker alignment. The outer ring 52 is supported by base 50 typically disposed in the forward portion of a missile. A rotating magnetic disk memory assembly is contained in housing 59, this assembly providing the memory function necessary in any correlation process. It will be noted that the reference numerals used herein correspond to those used in the Hembree application to the extent that commonality of elements exists.

Figure 7:
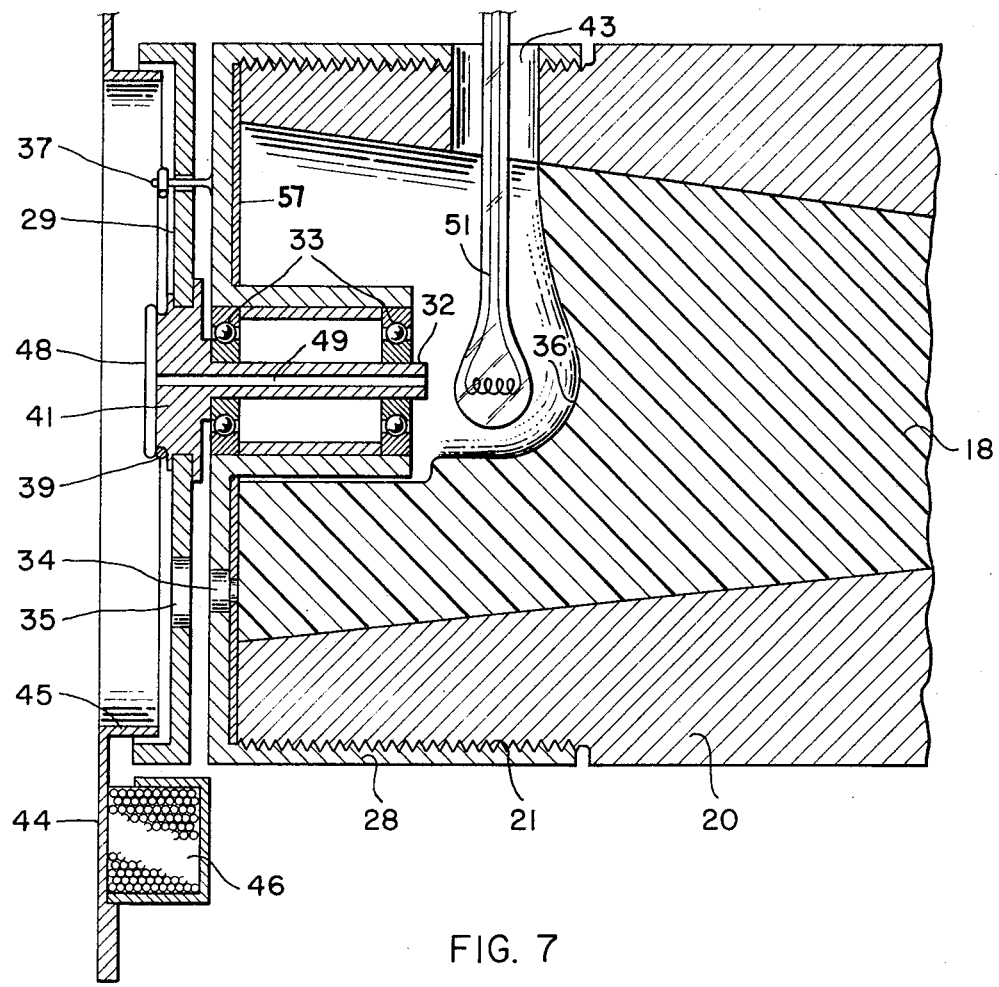
FIG. 7 is a cross-sectional view to a large scale showing certain details associated with support of the outer disk, and the illumination of the reticle as is brought about during the boresighting procedure.

The scanner 15 includes several components rotatable with the member 28 visible in FIGS. 2, 3 and 7. Latter member contains a radial slit 34, by which small portions of the field of view of the scanner may be viewed in succession. This slit, best seen in FIG. 3, is longer in the radial dimension than would normally be required, which construction is utilized for a reason set forth at length hereinafter. The disk member 28 is held in position at the end of the light pipe by means of an encircling member 20, whose inner surface is tapered to substantially coincide with the configuration of the flared end of the light pipe 18. The member 20 has external threads 21, which are engaged by the threads disposed around the inner periphery of the underside of member 28 at the time of its installation; note FIGS. 2, 3 and 7. The member 20 is preferably of a length such that the edge 22 remote from disk member 28 engages and rests against the inner race of the bearing 23; see FIG. 2.

Scanner 15 further includes a spin motor 30 to drive disc 28 in rotation, and also a photodetector, latter being disposed in tube 60 shown in FIG. 1. The output of the photodetector is connected to an analog-to-digital converter (not shown). The spin motor 30 typically turns at 4,000 rpm, and is arranged to drive the light pipe, and therefore the disk 28 at the same rotative speed. It may for example develop 40 inch-ounces of torque. Adjacent to the motor 30 is a sine-cosine generator 31, which in some embodiments of our invention is driven by the spin motor.

The output of the aforementioned converter is connected to a storage correlation switch which operates selectively to provide inputs to the memory system and to a correlator. The correlator processes the live and reference contrast pattern to provide a pair of output signals on specified leads representative of the angular misalignment between the memorized and current contrast patterns to an adaptive controller, data processing portion of which generates roll, pitch and yaw correction signals based on the angular misalignment measured misalignment the correlator. The Hembree invention cited above contains additional information pertinent to the immediately preceding material.

Referring to FIGS. 2 and 3 it will be noted that we have provided an outer disk 29 disposed closely adjacent to and parallel with disk 28, with disk 29 basically rotating with the inner disk, but in addition being rotatable with respect to the disk 28 for a limited number of degrees. This disk 29 is mounted upon shaft 32 visible in FIG. 2, which shaft in turn is mounted in a pair of small bearings 33 that are disposed in a suitable recess 36 in the center of the end of the light pipe 18. FIG. 7 shows latter details to a larger scale, and also depicts the hole 43 used during the initial alignment procedure.

Figure 4:
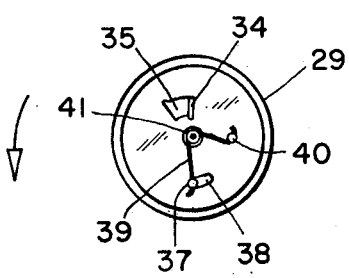
FIG. 4 is a view of the movable scanner disc arrangement, with the effective area of the slit being in the radially inner position, corresponding to the small optical field of view used at the time of launch.
Figure 5:
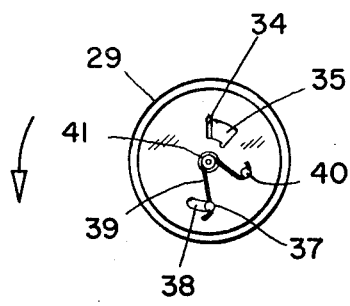
FIG. 5 is a view of the movable scanner disc arrangement, with the effective slit location being in the radially outer position corresponding to a large field of view condition, used at the time of realignment of the tracker during flight of a missile.

As best seen in FIG. 3 through 5, the outer disk 29 is provided with an aperture 35 which is designed to be of a particular yet rather irregular configuration, and to substantially coincide with the location of the scan slit 34. It should be noted in this embodiment that despite relative movements of disk 29 with respect to disk 28, at all times a predetermined length of the radial slit 34 is visible through aperture 35. However, the effective location of the slit moves radially as relative motion takes place between the disks 28 and 29.

This latter fact will be more apparent from a study of FIGS. 4 and 5 in which the slit 34 is visible at the right hand end of aperture 35 in FIG. 4, which corresponds to the small field of view configuration of the scanner, which setting is utilized in launch and again at rememorization time. The irregular aperture 35 is configured at its right hand end such that the radially innermost part of the slit 34 is effective, or in another words, the rotating disk sweeps out a comparatively small diameter pattern. This should be contrasted with the slit and aperture arrangement shown in FIG. 5 wherein the outer disk 29 has moved relative to disk 28 so as to cause the slit 34 to be visible through the left hand end of the aperture 35. Inasmuch as this lefthand end of the aperture extends for a distance radially outwardly with respect to the rest of the aperture, this in effect causes the rotating slit to sweep a larger diameter and thus corresonds to a large field of view condition or setting.

The proper relationships of the disks to each other insofar as the basic alignments of the slit and aperture are concerned is assured by the use of a pin and slot arrangement in which a pin 37 provided on disk 28 is arranged to extend up through a slot 38 provided in the outer disk. This slot extends arcuately for an extent corresponding to the angular or circumferential extent of the aperture 35, thus preventing the outer disk from moving further counterclockwise with regard to the disk 28 than is shown in FIG. 4, or further clockwise with respect to the inner disk than is shown in FIG. 5.

The outer disk 29 is a low-inertia member that is normally biased to the small field of view position illustrated in FIG. 4 by means of a spring 39 that is bent so as to extend between stationary pin 40 on the outer disk, around the center pivot 41 of the outer disk, and then anchor upon pin 37. The spring 39 normally biases the outer disk to the position shown in FIG. 4 in which the slit 34 appears to be in the radially inner position, but upon a drag effect being imposed upon the outer disk, it moves relative to disk 28 so as to overcome the spring to the extent shown in FIG. 5, with the aperture 35 thus moving so as to dispose the slit 11 effectively in the position corresponding to its large field of view location. This drag effect is brought about by the drag or flux brake coil 44 illustrated in FIGS. 2 and 3, with it being understood that in the latter figure the coil has been inverted with respect to the other members to reveal the discrete finger-like members 45 that in effect help define the location in which the rim of the outer disk is disposed when these members are in the assembled relationship shown in FIG. 2.

As will b apparent, when the coil windings 46 are energized, this will cause a braking effect on the outer disk, causing it to move so as to overcome the spring 39 and to cause the aperture 35 to move so as to be in substantial alignment with the slit 34 while the aperture is in its radially outward position or location. The outer disk 29 is preferably constructed from a low inertial material such as aluminum, magnesium, or other good conductor. The material used for the outer disk 29 thus does not need to have magnetic properties, but the outer disk exhibits single shorted turn properties when placed in a magnetic flux arrangement of the type illustrated at the top of FIG. 3. In other words, the coil and this disk function together to form an eddy current brake, serving to put a selected amount of drag on the outer disk, and to cause it on occasion to move relative to the disk 28.

Figure 6:
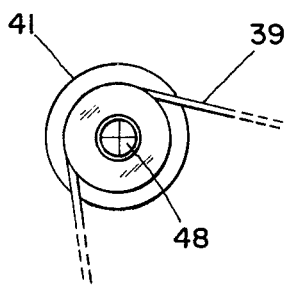
FIG. 6 is a view to a much larger scale the reticle arrangement used in initial alignment and boresighting procedures.

Referring to FIG. 6, it will be noted that the pivot 41 associated with the image plane scanner is illustrated in greatly enlarged form, with a portion of the spring 39 shown in contact therewith. In the center of the pivot is located a small reticle 48 that is utilized during the boresighting of the object lens 62, to make sure that it is disposed at the center of rotation of the scanner.

Referring to FIG. 7, which has also been executed to a large scale, it will be noted that the reticle is shown in cross section along with the shaft 32 and the hole 49 that extends through the shaft 32 in order that the boresighting may be carried out, such as in connection with the installation of an in-flight camera or other ancillary device. During this alignment procedure, a source of illumination such as a very small electric bulb 15 is inserted through hole 43 in the side of member 20, a portion of which hole is shown in FIG. 3. This bulb is placed up behind the hole 49 through the shaft 32 so that the use of the reticle arrangement will be made more convenient. The bulb 51 may be of a so-called grain of wheat size, and is of course removed before the device is operated.

Figure 9:
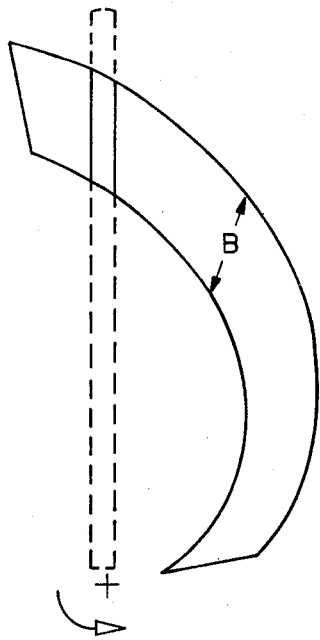
FIG. 9 is an enlarged view showing a scimitar-shaped aperture used with a radial slit, such aperture having a constant effective radial dimension.
Figure 10:
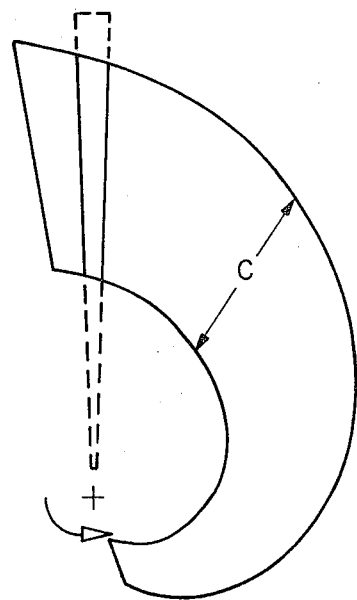
FIG. 10 is an enlarged view of another scimitar-shaped aperture, with the configuration being such that an increasingly larger part of the radial slit becomes effective as relative motion takes place between slit and aperture.

As has been seen, a primary embodiment of our image plane scanner assembly has two different positions corresponding to the different fields of view. However, if the flanged outer disk which is selectively deflected by the magnetic drag brake were made with a scimitar-shaped aperture such as shown in FIGS. 9 or 10, instead of with the aperture shown in FIGS. 3 – 5, then a continuous variation in the optical field of view swept out by the combination could be achieved by relative motion of the aperture with respect to the scan slit. In this new embodiment, the outer disk would be constrained to one extreme position by a linear spring attached between the inner and outer disks. Graduations in the electrical input to the magnetic drag brake will cause the outer disk and its aperture to rotate with respect to the scan slit proportionally to the applied electrical input.

Two different slit and aperture combinations can be used. In the configuration according to FIG. 9, the sides of the slit proper are of the same curvature, and the distance from one radial point on the scimitar-shaped aperture to the other side (distance B) is constant. In this configuration, if the scimitar shaped aperture is rotated relative to the slit about the center point shown by the "+" mark, the same effective slit size is maintained. This tends to permit the same amount of light flux to pass through the device to minimize automatic gain control requirements. In the configuration according to FIG. 10, however, the sides of the slit proper are radial lines and distance C varies in proportion to the distance from the center of the scan disk. This configuration ensures the same shape of slit will occur for all positions of the scimitar-shaped aperture with respect to the scan slit. This is useful where brightness control (automatic gain control) is available or is not a problem or it is desirable to scan an object at some one range (say with a small field of view) and later enlarge the field of view by moving the aperture and continue to look at the same object as the range changes.

The proportional scimitar-shaped embodiments of FIGS. 9 and 10 both can be used in connection with tracking during range closure. If this device were used in an air to surface missile which dives on the target, an altimeter signal could be used to determine the current to flow through magnetic brake. If the current were made a simple function of range, the device could be made to scan the same ground region during closure. Alternately, a correlation tracking loop could be used to control the flow of current in the brake to make the scimitar-shaped aperture rotate to track in zoom.

In other embodiments, three or more discrete fields of view could be used by combining the capability to proportionally vary the magnetic brake torque with non-linear springs. An aperture for three discrete fields of view is shown in the enlarged configuration set forth in FIG. 11, wherein a three step aperture 135 disposed in an outer disk is selectively movable relative to an elongated radial slit 134 contained in the inner disk. A pin 137 and slot 138 arrangement contained in the inner and outer disks, respectively, prevents the two disks from rotating about the centerpoint shown by the "+" mark for too great a relative extent. Bias in this instance may take the form of a pair of springs 63 and 64 mounted on pin 137. The longer, more flexible spring 63 bears against a pin 140 disposed on the outer disk, tending to bias latter disk in the direction of the largest field of view, although bias toward the smallest field of view could be arranged if desired. Unlike the preceding embodiments, the spin direction of the inner and outer disks is clockwise in FIG. 11.

A small magnetic brake torque is sufficient to flex spring 63 sufficiently for the aperture to move to the middle position illustrated, but a much stronger magnetic brake torque is required to flex both spring 63 and stiff spring 64 to rotate the aperture to the smallest field-of-view position.

Whereas in the primary embodiment of our invention to the ratio between the diameters swept out by the two fields of view is typically approximately 0.8 to 1, it may in some instances be desirable to have a much larger ratio, such as 0.2 to 1 between the diameters of the small and the large fields of view. The shutter slit assembly depicted in the configuration according to FIG. 12 is appropriate for extreme ratios between the fields of view. In this configuration the slit arrangement actually involves two slits, slit 71 and 72, disposed on the inner member. Two apertures, 73 and 74 are disposed in the outer or shutter member such that one entire slit, say slit 71 is normally visible through aperture 73 and therefore effective when the drag brake is not energized, whereas the other slit, slit 72, is visible through aperture 74, as shown in FIG. 12, when the drag brake is energized.

It should be noted that our invention does not require a new inner disk member 28 each time the outer disk is changed to bring about the use of a different aperture. This is because a thin member 57 such as copper may be used behind the disk 28, as seen in FIG. 7, in which thin member a slit of the precisely appropriate width and radial length may be used. Thus, the slit 34 appearing in the perspective illustration in accordance with FIG. 3 may not be the determining size, but rather the effective slit area may be determined by picking a member 57 having a slit configuration that best cooperates with the particular aperture contained in the outer disk member.

Figure 8:
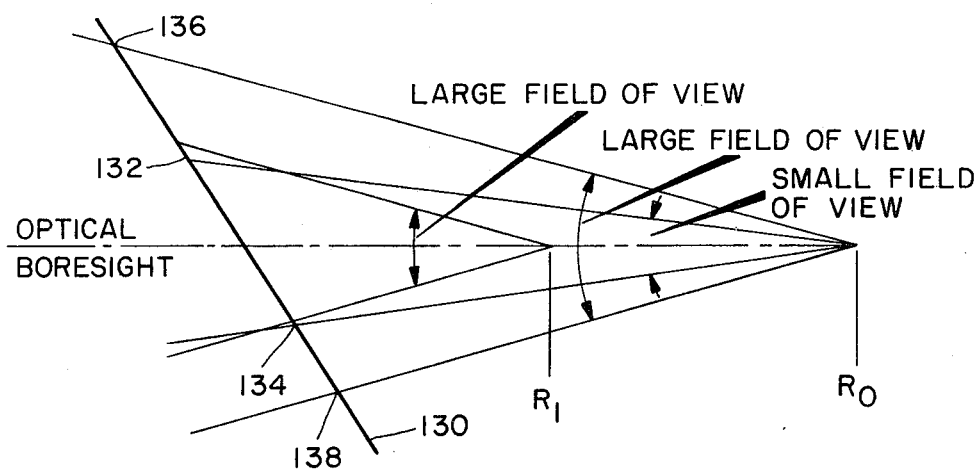
FIG. 8 is a diagram adapted from the Hembree case, showing the manner in which multiple field of view optics may be used to correct for the errors accumulated during flight of a missile.

In FIG. 8 is shown an optical diagram indicating the advantages that can be obtained by employing a variable field of view system, For example, if a missile with an optical area correlator that is equipped with our invention is situated at range $R_0$, it may be seen that the device operating under a small field of view condition will intersect the surface 130 of the target at points 132 and 134. While the missile is at $R_0$, it is optically boresighted with the target on plane 130 and a reference memory is obtained utilizing this small field of view setting. Then, the missile flies toward the target using the small field of view optical arrangement until decorrelation occurs. At this time, which is before the missile reaches $R_1$, the optical system is changed to the large field of view. As the correlator appraoches $R_1$ utilizing the large field of view, a realignment takes place such that the correlator boresight axis becomes coincident with the original line of sight because the reference previously taken at $R_0$ now corresponds to the live scene taken at $R_1$ with the large field of view. The errors accumulated with respect to the line of sight are diminished because the invention takes advantage of the fact that the pattern seen at $R_1$ with the large field of view corresponds closely to the pattern previously seen at $R_0$ utilizing the small field of view arrangement.

It should be noted that at the moment the reference that had been at $R_0$ corresponds to the live pattern seen with the large field of view at $R_1$, a command is generated which causes the system to go back to the small field of view and take a new reference. The missile thus again flies toward the target under the small field of view condition until decorrelation occurs, at which time another cycle of the operation described above takes place.

As should now be apparent, we have provided a versatile and highly effective image plane scanner assembly that can be easily and rapidly employed to bring about field of view switching, involving a minimum amount of space, cost and weight.

That which is claimed is:

1. In a shiftable aperture arrangement for an optical area correlation system in which means are utilized for driving a plurality of adjacent members in rotation about a common axis at a desired number of revolutions per second, said arrangement comprising said plurality of adjacent members disposed adjacent the image plane of said correlation system, a first of said members containing a scanning slit rotatable at substantial speed and a second of said members being rotatable at substantial speed, but being selectively rotatable with respect to said first member for a few degrss, said second member containing an aperture essentially aligned with said slit, said aperture having a pre-established configuration, with the arrangement being such that relative rotation movement of said members to cause relative movement of said aperture and slit accomplishes a radial repositioning of the effective area of said slit.

2. The shiftable aperature arrangement as defined in claim 1 in which the effective area of said slit is movable between pre-established radially inner and radially outer positions.

3. The shiftable aperture arrangement as defined in claim 1 in which the effective area of said slit is movable between more than two different radial positions.

4. The shiftable aperture arrangement as defined in claim 1 in which the effective area of said slit is movable between an infinite number of positions disposed between an extreme inner position and an extreme outer position.

5. The shiftable aperature arrangement as defined in claim 4 in which the effective area of said slit remains essentially constant as it moves radially.

6. The shiftable aperture arrangement as defined in claim 4 in which the effective area of said slit gets progressively larger as it moves radially outwardly.

7. In a shiftable aperture arrangement for an optical area correlation system in which a plurality of adjacent members are driven in rotation about a common axis by driving means serving to rotate the members at a desired number of revolutions per second, said arrangement comprising a plurality of said adjacent members rotatable about a common axis, and disposed adjacent the image plane of said correlation system, a first of said members containing slit means for generating during rapid rotation, a contrast pattern of the area within the field of view of the optical area correlation system at a given time, and a second member rotatable with said first member but additionally being selectively rotatable with respect to said first member for a few degrees, containing aperture means essentially aligned with said slit means, said aperture means having a pre-established configuration, with the arrangement being such that relative rotative movement of said members to cause relative movement of said aperture and slit means accomplishes a radial respositioning of the effective area of said slit means and hence a field of view change.

8. The shiftable aperture arrangement as defined in claim 7 wherein the first and second members contain only a single slit and a single aperture, respectively, with the effective area of the slit being movable between pre-established radially inner and radially outer position.

9. The shiftable aperture arrangement as defined in claim 7 wherein the first and second members contain only a pair of slits and a pair of apertures, respectively, with the effective slit area being movable between pre-established radially inner and radially outer positions.

10. The shiftable aperture arrangement as defined in claim 7 in which spring bias means is used to control the relation between said first and second members, which spring bias means serves to normally bias the members such that the effective area of the slit is positioned to correspond with a large field of view.

11. The shiftable aperture arrangement as defined in claim 7 in which spring bias means is used to control the relation between said first and second members, which spring bias means serves to normally bias the members such that the effective area of the slit is positioned to correspond with a small field of view.

12. The shiftable aperture arrangement as defined in claim 7 in which electric drag brake means is used to act selectively upon said second member, to control its positioning relative to the first member.

* * * * *